United States Patent [19]

Misawa

[11] Patent Number: 5,676,215
[45] Date of Patent: Oct. 14, 1997

[54] STAIR-CLIMBING CRAWLER TRANSPORTER

[75] Inventor: Rintaro Misawa, Saitama-ken, Japan

[73] Assignee: Sunwa Sharyo Manufacturing Co., Ltd., Tokyo, Japan

[21] Appl. No.: 515,247

[22] Filed: Aug. 16, 1995

[30] Foreign Application Priority Data

Aug. 24, 1994 [JP] Japan .................... 6-199492

[51] Int. Cl.$^6$ .................... B62D 55/075
[52] U.S. Cl. .................... 180/9.52; 180/9.32
[58] Field of Search .................... 180/8.2, 9.1, 9.32, 180/9.5, 9.52, 193, 190

[56] References Cited

U.S. PATENT DOCUMENTS

| | | | |
|---|---|---|---|
| 3,276,531 | 10/1966 | Hale et al. | 180/9.32 X |
| 3,711,164 | 1/1973 | Chaumont | 180/193 X |
| 3,756,667 | 9/1973 | Bombardier et al. | 180/193 X |
| 3,887,243 | 6/1975 | Chaumont | 180/193 X |
| 4,483,407 | 11/1984 | Iwamoto et al. | 180/9.1 X |
| 4,566,551 | 1/1986 | Feliz | 180/9.1 |
| 4,702,331 | 10/1987 | Hagihara et al. | 180/9.32 |
| 4,915,184 | 4/1990 | Watkins | 180/8.2 |
| 5,395,129 | 3/1995 | Kao | 180/9.32 X |

FOREIGN PATENT DOCUMENTS

| | | | |
|---|---|---|---|
| 206930 | 12/1988 | European Pat. Off. | 180/8.2 |
| 25 34 435 | 2/1977 | Germany | 180/8.2 |
| 160366 | 7/1986 | Japan | 180/8.2 |

Primary Examiner—Kevin Hurley
Attorney, Agent, or Firm—Nikaido Marmelstein Murray & Oram LLP

[57] ABSTRACT

A stair-climbing crawler transporter having a pair of belt supporting units contacting with an inner surface of the belt crawler at a ground contacting section between driving wheels and grounding wheels on both sides, and a jack connected to a bent connecting portion of the belt supporting unit. The belt supporting units are straightly supported by extending a piston rod of the jack on the way of stairs and are bent to form an inverted "V" by retracting the piston rod of the jack when the substantially intermediate portion of the ground contacting section contacts with a corner of the top step of stairs. Thus, the stair-climbing crawler transporter can smoothly ascend and descend stairs without tilting largely.

7 Claims, 5 Drawing Sheets

STAIR-CLIMBING CRAWLER TRANSPORTER

BACKGROUND OF THE INVENTION

The present invention relates to a stair-climbing crawler transporter which is able to ascend and descend stairs, more particularly to a stair-climbing crawler transporter which keeps a traveling angle thereof stable when it moves from the top step to a landing of stairs or descends from the landing of stairs.

There has been conventionally known a crawler transporter which is able to ascend and descend stairs. However, such a conventional crawler transporter has a drawback that a tilting angle thereof largely changes when it moves from the top step of stairs to the landing thereof or from the landing to the top step.

The large change of tilting angle of the crawler transporter causes an operator to have a great fear. In the case that the crawler transporter is a wheelchair carrier, a person sitting on a wheelchair also would feel the same great fear. Then, it is desired to keep the tilting angle small. As such a prior art, for instance, the Japanese Patent Publication No. 62-22834 is well known, which was disclosed by the present applicant. This prior art discloses a rail frame provided on a ground contacting section of the belt crawler and a crawler controlling surface itself of the rail frame being concavely bent in advance at a substantially intermediate portion of the longitudinal direction which is near the center of gravity of the total weight of the crawler transporter, so that the tilting angle of the transporter is kept smaller than usual since a belt crawler is concavely bent when a corner of the top step of stairs contacts with the substantially intermediate portion of the ground contacting section of transporter.

In the above-described prior art, the tilting angle of the transporter can be kept small by a certain degree when it moves from the top step of stairs to the landing thereof or from the landing to the top step. However, since the crawler controlling surface itself of the rail frame is fixedly bent, the degree of the concavity can not be kept so large taking a straightline travel into consideration. Consequently, it remains difficult for an operator to keep an operating posture continuously smooth since the operator still have to adjust the tilting angle of the transporter according to the position of the center of gravity thereof. Thus, the conventional crawler transporter can not resolve the problem that the operator feels a great fear.

SUMMARY OF THE INVENTION

An object of the present invention is to provide a stair-climbing crawler transporter, a pair of endless belt crawlers of which are straightly kept when the transporter moves on the way of stairs, whereas they are largely concavely bent like an inverted "V" at a substantially intermediate portion of a ground contacting section when the transporter arrives at the top step of stairs so as not to largely change a tilting angle of the transporter.

It is a further object of the present invention to give the belt crawler a desired tension by providing a spring mechanism between the idling wheels and the grounding wheels.

According to the present invention, there is provided a stair-climbing crawler transporter having a pair of driving wheels disposed near one end thereof, a pair of idling wheels and a pair of grounding wheels disposed near the other end thereof, and a pair of endless belt crawlers surrounding driving wheels, idling wheels and grounding wheels which has a span extending over two steps of stairs.

The transporter comprises a pair of belt supporting units contacting with an inner surface of the belt crawler at the ground contacting section between the driving wheels and the grounding wheels respectively, wherein both the belt supporting units are bendable like an inverted "V" at a position corresponding to a substantially intermediate portion of the belt ground contacting section, and a jack connected at one end thereof to a bent connecting portion of each belt supporting unit and the other end thereof being pivotally connected to the body of the transporter, so that each belt supporting unit is formed into a straight array on the way of stairs, whereas is formed into an inverted "V" when the substantially intermediate portion of the ground contacting section get into contact with a corner of a top step of stairs.

In an aspect of the invention, a spring mechanism is provided between the idling wheels and the grounding wheels for giving the belt crawler a desired tension by pushing both the idling and grounding wheels in each opposite direction, and the jack is a gas spring.

In another aspect of the invention, the jack is an electric or hydraulic jack. A sensor for detecting a running position of the transporter is connected with the jack, wherein the jack is extended so as to cause each belt supporting unit to form into a straight array on the way of stairs, and is retracted so as to bend the belt supporting unit into the inverted "V" when the substantially intermediate portion of the ground contacting section contacts with the corner of the top step of stairs.

The other objects and features of this invention will become understood from the following description with reference to the accompanying drawings.

DETAILED DESCRIPTION OF THE PREFERRED EMBODIMENTS

Figure 1:
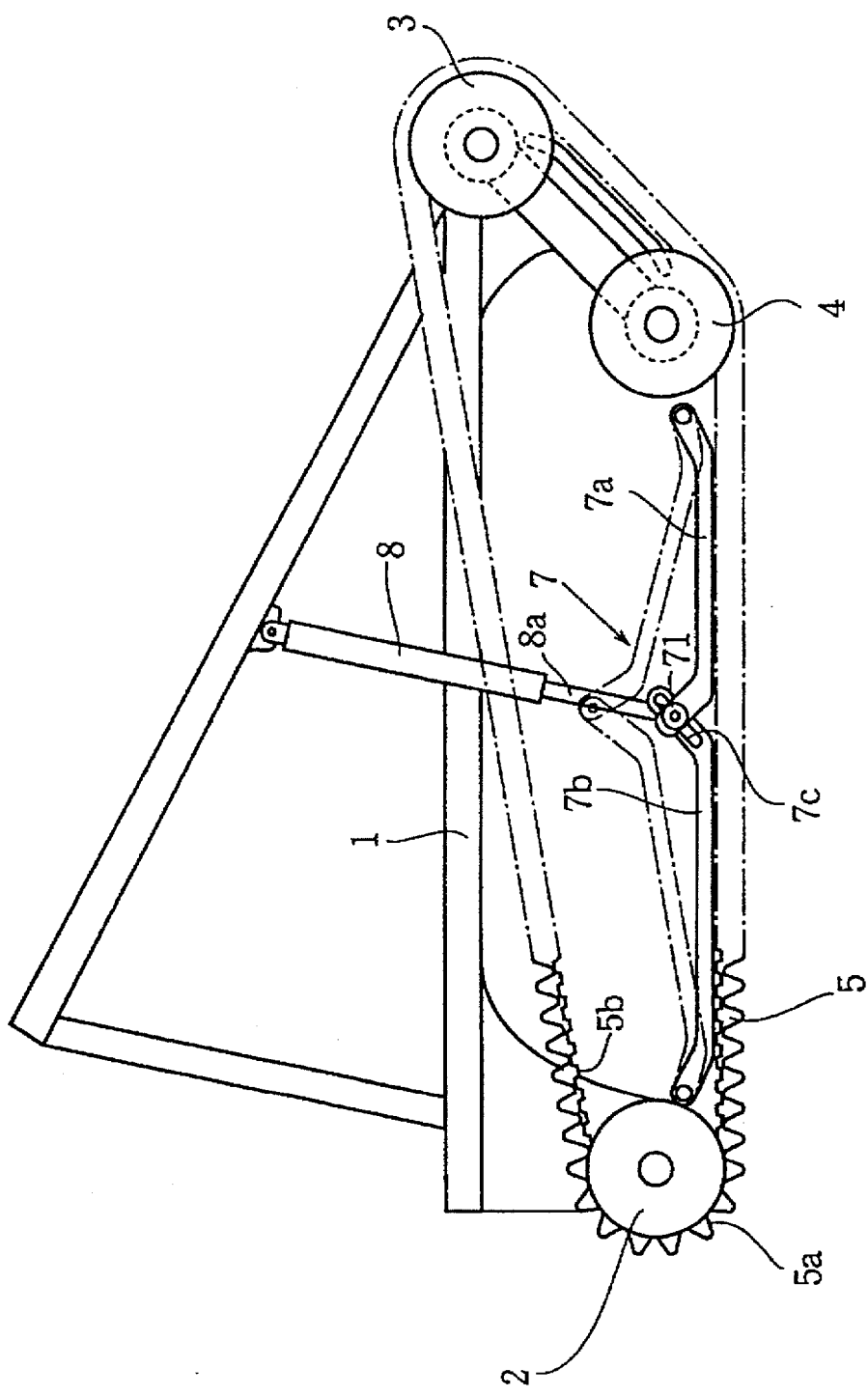
FIG. 1 is a schematic side view of a stair-climbing crawler transporter according to the present invention, an operating portion of which is not shown.

FIG. 1 shows a stair-climbing crawler transporter, an operating portion of which is not shown. A body 1 is provided with a pair of driving wheels 2 at one end of a longitudinal direction thereof, a pair of idling wheels 3 and a pair of grounding wheels 4 at the other end thereof. A pair of endless belt crawlers 5 made of elastic synthetic rubber to absorb shock as well as to protect the floor surface or staircase are surrounded on the driving wheel 2, the idling wheel 3 and the grounding wheel 4 on both sides, respectively, whereby constituting a crawler transporter having an oblique overhang portion at one end thereof.

Each belt crawler 5, which is conventionally well known, is provided with lugs 5a disposed at a predetermined interval on its outer surface to properly engage with steps of the stair. The inner surface of the belt crawler 5 is provided with lugs 5b engaged with driving teeth of each driving wheel 2, so as to prevent the belt crawler from slipping around the driving wheels 2. The driving wheel 2 is driven by a driving motor (not shown). The desired number of metal wire are inserted through the belt in the longitudinal direction so as to have a stiffness against a predetermined tension.

A ground contacting section of the endless belt crawler 5 between the driving wheel 2 and the grounding wheel 4 has a span extending over at least two steps of the staircase, and an oblique overhang portion between the idling wheel 3 and the grounding wheel 4 has a span extending over at least one step, when ascending and descending stairs.

Figure 2:
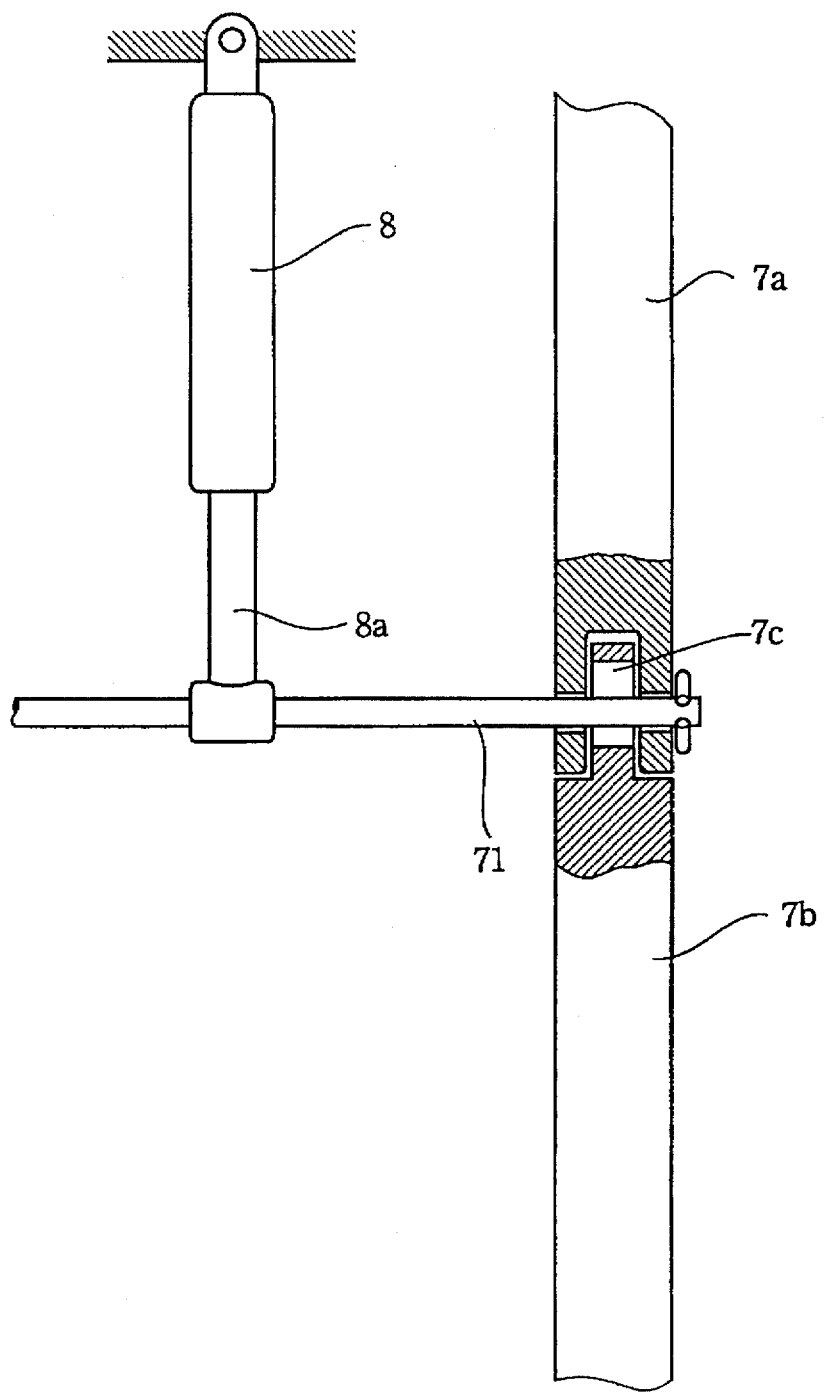
FIG. 2 is a plan view showing a bent connecting portion of a belt supporting unit, including a partial sectional view.

A pair of belt supporting units 7 are provided above the ground contacting section of the belt crawler 5 on both sides in order to control the bending movement of the belt crawler 5. Each belt supporting unit 7 comprises a front sleigh-like member 7a and a rear sleigh-like member 7b, which are connected with one another at a position corresponding to the substantially intermediate portion of the longitudinal direction in the ground contacting section. An outer end portion of each sleigh-like member 7a and 7b is pivotally connected on a body frame, and inner end portions thereof are interconnected through a connecting shaft 71. As shown in FIGS. 1 and 2, this connecting portion is provided with an elongate hole 7c as a communicating hole of the connecting shaft 71, which is formed at a connecting end of either the sleigh-like member 7a or 7b, so that the front sleigh-like member 7a and the rear sleigh-like member 7b may be raised upward at a connecting portion thereof and cooperate to form an inverted "V".

One end of a piston rod 8a of a gas spring 8 is connected with the bent connecting portion of the front sleigh-like member 7a and the rear sleigh-like member 7b through the connecting shaft 71, so that the spring force of the gas spring 8 is applied to the respective bent connecting portion of the both sides through expansion and contraction of the piston rod 8a.

Figure 4:
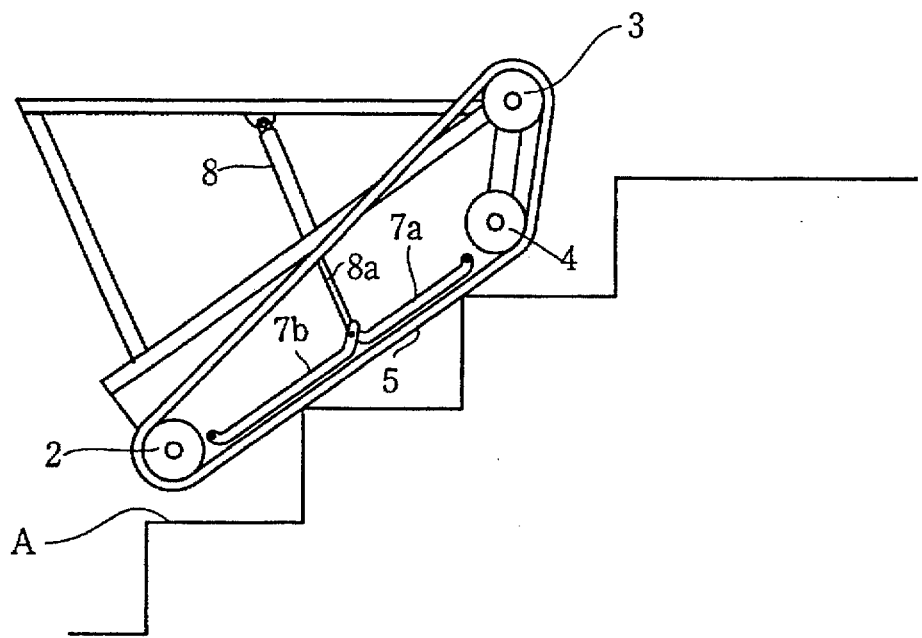
FIGS. 4a and 4b are explanatory views showing the stair-climbing operation of the crawler transporter.
Figure 4:
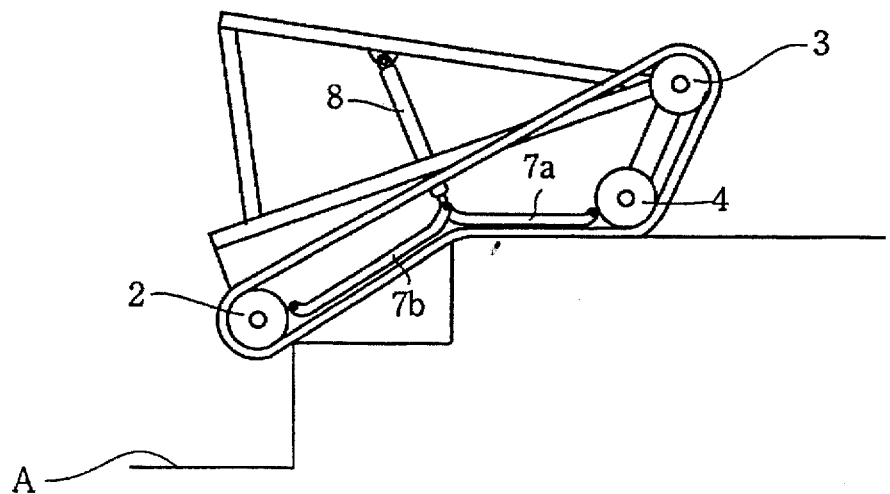

As shown in FIGS. 1 and 4, the other end of the gas spring 8 is pivotally connected on the body frame. The two belt supporting units 7 are straightly supported by the spring 8 when ascending or descending stairs by bringing the crawler 5 into contact with two steps, whereas the belt supporting units are concavely bent by a pushing pressure on the corner of the top step when the direction of the transporter is changed at the top step from an oblique condition to a horizontal condition and vice versa.

Figure 3:
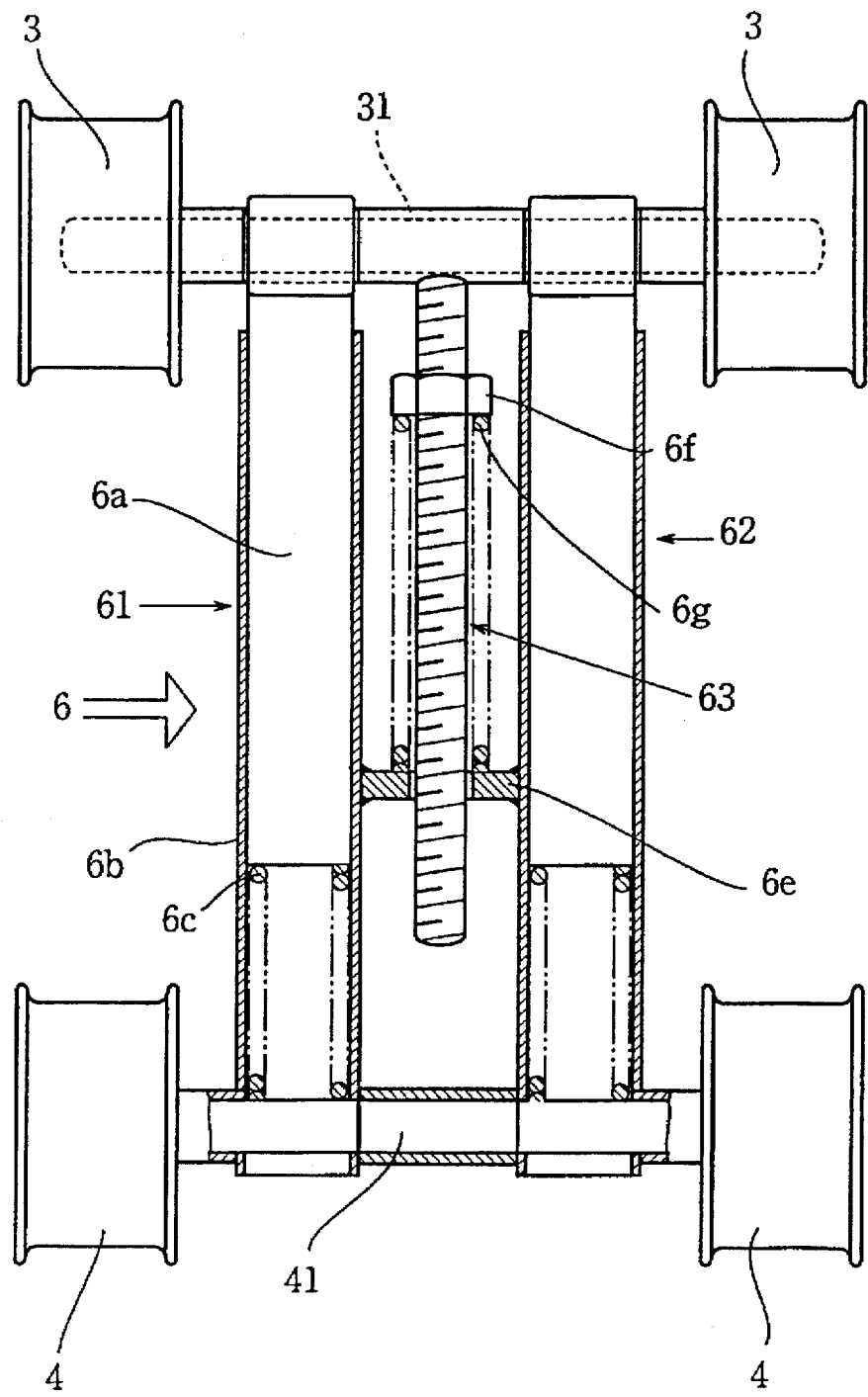
FIG. 3 is a cross sectional view of a spring mechanism disposed between a pair of idling wheels and a pair of grounding wheels.

Referring to FIG. 3, a spring mechanism 6 is provided between the idling wheels 3 and the grounding wheels 4.

The spring mechanism 6 is interposed between a shaft 31 rotatably supporting the idling wheels 3 and a shaft 41 rotatably supporting the grounding wheels 4. The spring mechanism 6 comprises a pair of spring cylinders 61, 62 on the right and left sides between the shafts 31 and 41 and an adjusting screw shaft 63 interposed between the spring cylinders 61, 62.

Each of the spring cylinders 61, 62 has a spring 6c disposed in a space formed by an inner cylinder 6a and an outer cylinder 6b. One end of the inner cylinder is pivotally connected to the shaft 31 of the idling wheels 3, and one end of the outer cylinder is pivotally connected to the shaft 41 of the grounding wheels 4, thereby the distance between the idling wheel 3 and the grounding wheel 4 is tensed in the direction apart from each other by means of the spring 6c to give a predetermined tension to the belt crawler 5.

Further, one end of the adjusting screw shaft 63 is pivotally connected to the shaft 31 of the idling wheels 3, and the other end thereof is rigidly inserted into a center hole of a plate 6e bridged between the spring cylinders 61, 62. Tightening an adjusting nut 6f engaged with the adjusting screw shaft 63 enables a spring force of an adjusting spring 6g interposed between the nut 6f and the plate 6e to be adjusted, thereby the tension given to the belt crawler 5 may be adjusted.

Referring to FIG. 4, the operation of the crawler transporter will be explained at the stage of ascending and descending stairs as follows.

The crawler transporter of the present invention ascends stairs A with the idling wheels 3 at the front side of a running direction as shown in FIG. 4a, whereas it descends reversely with the driving wheels 2 at the front side of a running direction as shown in FIG. 4b.

When ascending on the way of stairs A as shown in FIG. 4a, the ground contacting section between the grounding wheels 4 and the driving wheels 2 contacts with corners of more than two steps one after another, wherein the belt supporting units 7 keep the front and rear sleigh-like members 7a, 7b straight by the gas spring 8 to prevent the vertical movement of the belt crawler.

When arriving at the top step of stairs A as shown in FIG. 4b, only the corner of the top step contacts with the intermediate portion of the ground contacting section between the grounding wheels 4 and the driving wheels 2. Since the belt supporting units 7 for supporting the belt crawler 5 are resiliently supported by the gas spring 8, the front sleigh-like member 7a and the rear sleigh-like member 7b can cooperate to form an inverted "V" at the substantially intermediate portion of the ground contacting section. Namely, when the substantially intermediate portion of the ground contacting section moves near the corner of the top step, the front sleigh-like member 7a and the rear sleigh-like member 7b cooperate to form an inverted "V" against the spring force of the gas spring 8, thereby at the same time the ground contacting section of the belt crawler 5 is bent like the same inverted "V" so that the grounding wheels 4 can smoothly move to a flat landing of stairs without being extremely away from the stairs.

As a result, it becomes possible to keep the stable running posture of the crawler transporter without tilting largely while moving from the top step to the landing of stairs, whereby ensuring an improved safety for the operator of the transporter or the person sitting on the wheelchair mounted on the transporter.

Further, also when starting to descend the stairs from the flat landing, the ground contacting section is bent concavely after the driving wheels 2 pass over the corner of the top step, whereby the transporter starts to descend with the grounding wheels 4 remained on the landing. As a result, it becomes possible to keep the stable running posture of the crawler transporter without tilting largely as well as the above mentioned case of ascending.

Figure 5:
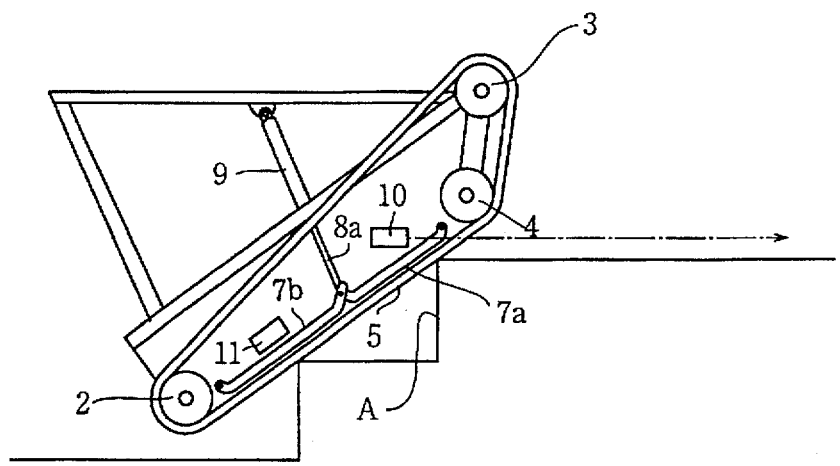
FIGS. 5a through 5c are explanatory views showing the stair-climbing operation of the crawler transporter by the other embodiment.
Figure 5:
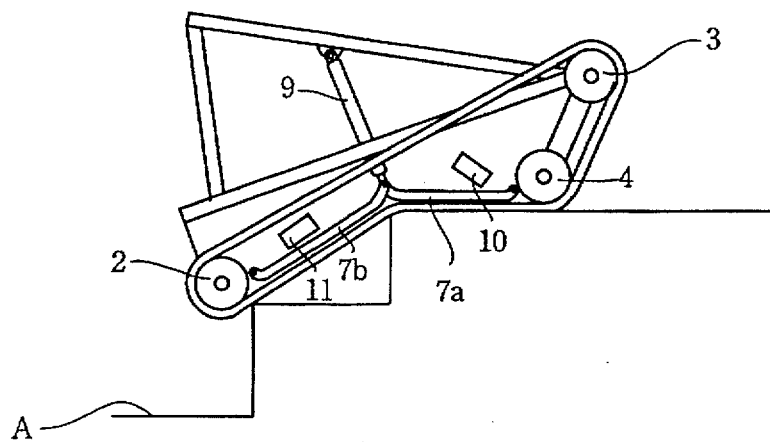
Figure 5:
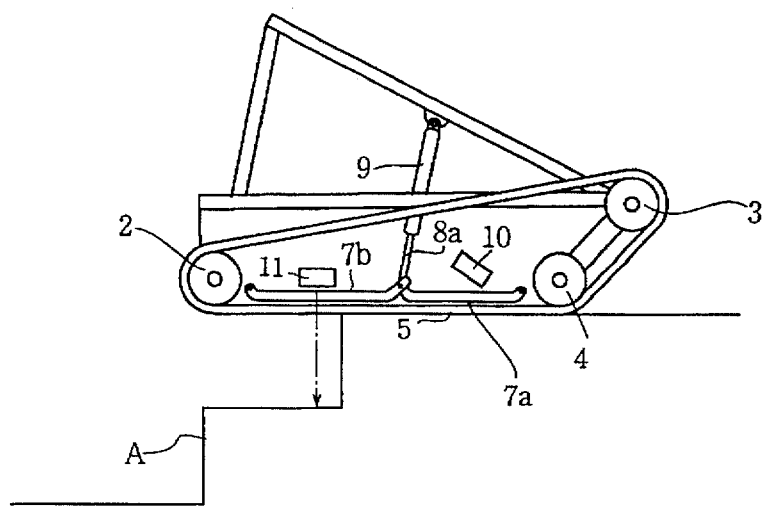

Next, another preferred embodiment of the gas spring 8 will be explained referring to FIG. 5. As shown in the drawing, the body 1 is provided with a sensor 10 for ascending and a sensor 11 for descending, which irradiate beam such as infrared radiation or ultrasonics and detect the running position of the body 1 with relation to stairs by the way of detecting the bounce of the irradiation.

An electric jack or a hydraulic jack 9 may be used in place of the gas spring 8, which can extend and retract the piston rod 8a by a motor (not shown) based on signals from the sensors 10, 11.

When it is detected that the running position is on the way of the stairs A by the sensor 10 for ascending, the jack 9 is extended so that the front sleigh-like member 7a and the rear sleigh-like member 7b cooperate to form a straight array. Thus, the belt supporting units 7 serve as a rail frame of the belt crawler 5, whereby preventing the crawler 5 from moving vertically, so that the transporter can ascend stairs smoothly.

As shown in FIG. 5a, when the grounding wheel 4 moves to the flat landing, the bounce of the irradiation breaks off. Thus, the sensor 10 detects that the transporter is on the top step, namely in the position where the running direction is changed from the oblique condition to the horizontal condition. After receiving the detection signal, the electric jack 9 is retracted so that the front sleigh-like member 7a and the rear sleigh-like member 7b can cooperate to form an inverted "V". Thus, as shown in FIG. 5b, the grounding wheel 4 smoothly moves to the flat landing without away from the stairs since the ground contacting section of the crawler 5 is adequately bent.

Further, as shown in FIG. 5c, when the transporter starts to descend from the landing of stairs in reverse, the front sleigh-like member 7a and the rear sleigh-like member 7b cooperate to form an inverted "V", upon detecting that the running direction is changed from the horizontal condition to the oblique condition by means of the sensor 11 for descending, so that the transporter starts to descend with the grounding wheel 4 remained on the landing and with the driving wheel contacting with the corner of the second step from the top. Thus, the transporter can smoothly descend stairs without tilting largely.

While the presently preferred embodiments of the present invention has been shown and described, it is to be understood that these disclosures are for the purpose of illustration and that various changes and modifications may be made without departing from the scope of the invention as set forth in the appended claims.

What is claimed is:

1. A stair-climbing crawler transporter having a pair of driving wheels disposed near one end thereof, a pair of idling wheels and a pair of grounding wheels disposed near the other end thereof, and a pair of endless belt crawlers surrounding the driving wheels, the idling wheels and the grounding wheels, the transporter comprising:

a pair of belt supporting units provided above a ground contacting section of the belt crawler between the driving wheels and the grounding wheels, each belt supporting unit being bendable to an inverted V-shape the apex of which is located in a position substantially intermediate of the ground contacting section between the driving wheels and the grounding wheels; and a jack connected at one end thereof to a connecting portion of each belt supporting unit and pivotally connected at the other end thereof to a transporter body, for forming the belt supporting units into a straight arrangement and into an inverted V-shape.

2. The stair-climbing crawler transporter according to claim 1, further comprising a spring mechanism provided between the idling wheels and the grounding wheels for giving the belt crawlers a desired tension by pushing both the idling and the grounding wheels in opposite directions.

3. The stair-climbing crawler transporter according to claim 1, or 2, wherein the jack is a gas spring.

4. The stair-climbing crawler transporter according to claim 1 or 2, wherein the jack is selected from the group consisting of an electric jack and a hydraulic jack.

5. The stair-climbing crawler transporter according to claim 4, further comprising a sensor for detecting a position of the transporter with relation to a set of steps, the sensor being in communication with the jack such that the jack is extended so as to cause the belt supporting units to form into a straight arrangement and is retracted so as to form the belt supporting units into an inverted V-shape when a top.

6. A stair-climbing crawler transporter having a pair of driving wheels disposed near one end thereof, a pair of idling wheels and a pair of grounding wheels disposed near the other end thereof, and a pair of endless belt crawlers surrounding the driving wheels, the idling wheels and the grounding wheels, the transporter comprising:

a pair of belt supporting units provided above a ground contacting section of the belt crawler between the driving wheels and the grounding wheels, each belt supporting unit being bendable to an inverted V-shape the apex of which is located in a position substantially intermediate of the ground contacting section between the driving wheels and the grounding wheels;

a spring mechanism provided between the idling wheels and the grounding wheels for giving the belt crawler a desired tension by pushing both the idling and the grounding wheels in opposite directions; and a jack connected at one end thereof to a connecting portion of each belt supporting unit and pivotally connected at the other end thereof to a transporter body, for forming the belt supporting units into a straight arrangement and into an inverted V-shape.

7. The stair-climbing crawler transporter according to claim 6, wherein the jack is a gas spring.

* * * * *